Dec. 15, 1959  R. E. SATTLER  2,916,889
AUTOMATIC PURGING OF LIQUID METHANE TANKS
Filed July 14, 1955

INVENTOR.
R. E. SATTLER
BY
ATTORNEYS

United States Patent Office 2,916,889
Patented Dec. 15, 1959

2,916,889

AUTOMATIC PURGING OF LIQUID METHANE TANKS

Robert E. Sattler, Bartlesville, Okla., assignor to Phillips Petroleum Company, a corporation of Delaware Application July 14, 1955, Serial No. 522,068

8 Claims. (Cl. 62—55)

This invention relates to purging of tanks in which inflammable liquified gases are stored. In one aspect it relates to the purging of tanks in which inflammable liquefied gases are stored by flushing with a non-inflammable and noncombustion supporting gas after the liquid has been removed. In another aspect it relates to the purging of tanks in which liquid methane is stored and after the liquid methane is removed, the purging being by displacing residual vaporous methane by such gases as nitrogen and/or carbon dioxide so that explosive mixtures of methane vapor with air will not form.

Prior art discloses the use of solid carbon dioxide in direct contact with stored liquid but while its use might under some conditions be more or less satisfactory it also has many disadvantages. When solid carbon dioxide is placed in a tank and liquid methane added at least some carbon dioxide will dissolve in the liquid methane at the very low liquid methane temperature when stored under atmospheric pressure. It is preferable in most cases to store liquid methane under atmospheric pressure. When methane is stored under a superatmospheric pressure, low temperatures still have to be used because the critical temperature of methane is quite low. For this reason the storage of methane in closed vessels at substantially superatmospheric pressures is usually undesirable.

In the use of solid carbon dioxide for reducing explosive hazards in methane storage tanks a substantial portion of the carbon dioxide which dissolves in the liquid methane will be vaporized with the methane in case the methane is removed from the storage vessel as a gas. It is obvious that all of the dissolved carbon dioxide will be removed from the storage vessel with the methane in case the liquid methane is removed. In any event, excessive quantities of carbon dioxide will have to be used in order to make certain that sufficient quantities of this material will be present after removal of the methane, to vaporize and to prevent the formation of explosive mixtures.

Nitrogen gas has also been disclosed as an agent for diluting residual methane vapors in a tank after removal of stored liquid methane. Upon addition of liquid methane to a tank containing gaseous nitrogen, and/or gaseous carbon dioxide, at least some of the nitrogen (and/or carbon dioxide) will be dissolved in the liquid methane and such dissolved gas will then be lost from the tank upon removal of the stored methane either as gas or liquid. However, much of the nitrogen (and/or carbon dioxide gas) will also be lost from the tank when first adding liquid methane for storage because of the violent boiling of the liquid methane upon contacting the relatively warm walls of the storage tank.

An object of my invention is to provide a method for preventing entrance of air to form a combustible vapor in a tank when the tank is emptied of a volatile stored combustible liquid.

Another object of my invention is to provide a method for purging a tank of inflammable vapors following removal of volatile stored combustible liquid.

Still another object of my invention is to provide a method for at least partially purging inflammable vapors from a storage tank and diluting the residual vapors with sufficient noncombustible and concombustion supporting gas as to reduce explosive hazards.

Yet another object of my invention is to provide a method for automatically purging a liquid methane storage tank of methane vapors and to so dilute remaining vapors when the tank is emptied of liquid as to reduce the explosive hazards.

Still other objects and advantages of my invention will be realized upon reading the following disclosure and drawing which describe and illustrate a preferred embodiment of my invention.

I accomplish the aforesaid objects and advantages by providing a method for storing inflammable liquified gas in a tank at atmospheric pressure, the improvement comprising withdrawing stored contents of said tank until such time that the tank is substantially free of liquid, allowing the temperature of the vapor content of said tank to rise above the boiling point of the stored volatile liquid by absorption of heat from the atmosphere, introducing a noncombustible and noncombustion supporting gas into said tank in response to said rise in temperature of said vapor content until such time as at least a portion of the vapor of the previously stored liquid is purged.

In the drawing Figure 1 illustrates, in diagrammatic form, a preferred embodiment of apparatus for carrying out my invention.

Figure 1:
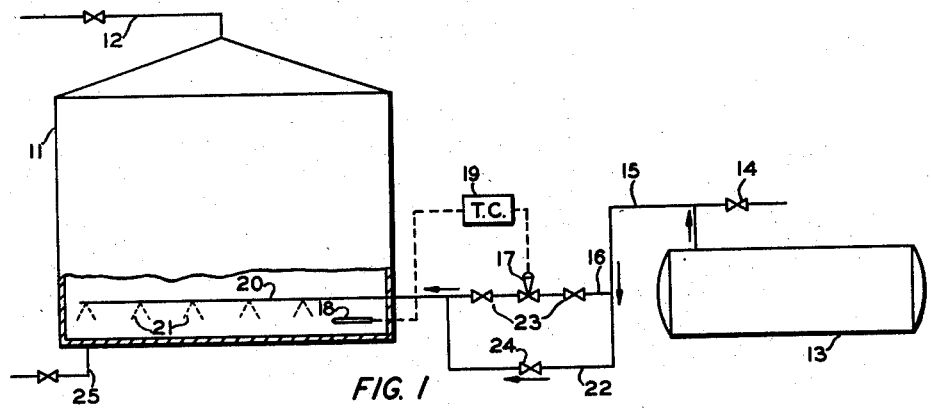

Referring to the drawing and specifically to Figure 1, reference numeral 11 identifies a tank in which a combustible material such as methane is stored as a liquid under substantially atmospheric pressure. A pipe 12 is attached to the top of the tank for removal of the gaseous contents of the tank, and a pipe 25, attached to the bottom of the tank, is for addition of or for removal of liquid therefrom. A pressure vessel 13 is provided outside of tank 11 for storage of a noncombustible, noncombustion supporting gas such as nitrogen, or carbon dioxide. A pipe 15 leads from tank 13 and is connected with pipes 16 and 22. Pipe 16 is provided with manually operable valves 23 and with a normally closed motor valve 17. Pipe 22 is provided with a manually operable valve 24. A pipe 20 within tank 11 is in fluid communication with pipe 16 for passage of gas from tank 13 into tank 11. A thermocouple or other temperature responsive element 18 is provided in the tank 11, as shown, at a point at least very near its bottom. A temperature-controller 19 is operatively connected with the temperature responsive element 18 and with the motor valve 17. This temperature responsive element 18 responds to a temperature above the normal boiling point of the stored material to cause the temperature-controller 19 to operate the motor valve 17 from a closed to an open position. Preferably in the bottom side of pipe 20 are a plurality of openings through which inert gas 21 from tank 13 is distributed to all portions of the bottom area of the tank. Valve 14 is normally closed and is provided specifically for purposes of filling tank 13 with the noncombustible and noncombustion supporting gas.

In the operation of the embodiment illustrated in Figure 1 with tank 13 previously filled with the purging gas and motor valve 17 closed and manually operable valves 23 being open and valve 24 in pipe 22 being closed, the system is in readiness for operation. Upon substantially complete removal of stored liquid either as a gas through pipe 12 or in liquid form through pipe 25, the temperature of the vapor contents of the tank increases by absorption of heat from the atmosphere because there is not any liquid present in the tank to absorb such heat as latent heat of vaporization. When all of the liquid is absent the temperature responsive element 18 increases in temperature and when a predetermined temperature rise occurs controller 19 operates to open motor valve 17 and allow, for example, nitrogen or carbon dioxide gas to flow through pipes 15, 16 and 20 and to be distributed throughout the bottom area of tank 11. When either nitrogen or carbon dioxide issues from the openings in pipe 20, and these gases being heavier than the stored methane, the vaporous methane is gradually displaced from the tank and flows out of the tank through the valved line 12. It is intended that sufficient of the displacing gas be introduced into the tank either that substantially all of the methane vapors be displaced or that the concentration of the remaining methane be sufficiently small that explosive mixtures are not formed after the tank has warmed up to substantially atmospheric temperature and "breathing" begins which causes the admission of air. When the residual contents of the tank are high in nitrogen or carbon dioxide concentration a higher concentration of methane can be tolerated than when the methane contents are diluted only with air and yet provide a nonexplosive atmosphere.

As mentioned, the noncombustible and noncombustion supporting material in tank 13 can be either carbon dioxide or nitrogen gas, the latter being preferred. If carbon dioxide is used sufficient pressure is maintained in tank 13 so that the carbon dioxide is stored as a liquid, such pressure being in the vicinity of 5 or 6 atmospheres. The motor valve 17, the temperature responsive element 18 and the controller 19 are illustrated herein as being an electrically operated system but it is obvious that fluid pressure operated apparatus is equally well adapted and thermocouple 18 can be replaced by a Bourdon tube and motor valve 17 can be a pneumatically operated motor valve, while controller 19 is then a pneumatically operated controller. Both the electrically operated apparatus and pneumatically operated apparatus are available in commerce and those skilled in the art understand the installation and operation of both systems.

Figure 2:
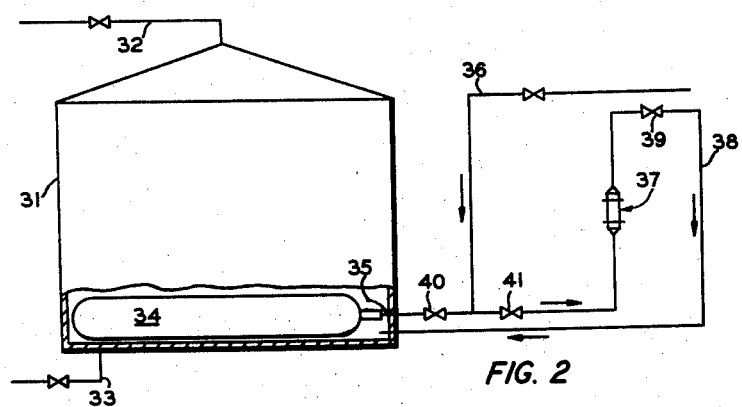
Figure 2 illustrates in diagrammatic form apparatus for practicing an alternate operation of my invention.
Figure 3:
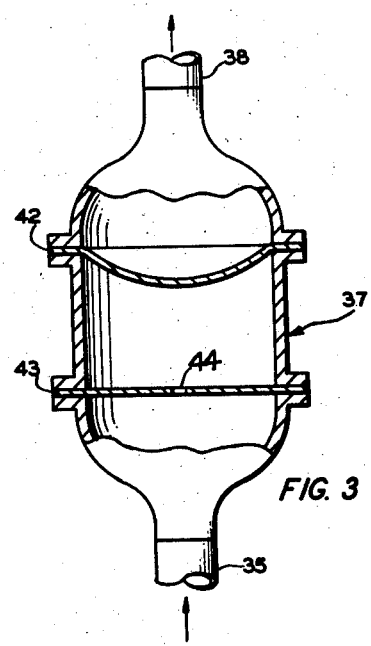
Figure 3 is an elevational view, partly in section, of a portion of the apparatus of Figure 2 on an enlarged scale.

In Figure 2 is illustrated another embodiment of my purging system in which tank 31 is the storage tank. Valved pipes 32 and 33 are for passage of vapor and liquid, respectively, into and from the tank. A cylinder 34 disposed within tank 31 as shown is for storage of the noncombustible noncombustion supporting gas. A conduit 35 is attached to cylinder 34 and extends through the wall of tank 31. An apparatus 37 is attached at one end to conduit 35 and at the other end to a conduit 38. Within apparatus 37 is disposed, as illustrated in Figure 3, an orifice plate 43, having an orifice 44, and a pressure rupturable disk 42. Conduit 38 leads from apparatus 37 through the wall of tank 31 at a point near its bottom. A pipe 36 is attached to pipe 35 between a pair of manually operable valves 40 and 41. Valves 40, 41 and valve 39 are open and the valve in pipe 36 is closed when this system is in operation. For filling cylinder 34 with the inert gas, valve 41 is closed and valve 40 and the valve in pipe 36 are open and the gas is introduced through pipe 36.

In the operation of this embodiment of my invention the cylinder 34 because of its positioning in tank 31 is submerged in or is at least touching the liquid contents of the tank until such time as the liquid is substantially entirely removed from the tank. Since liquid methane when stored under atmospheric pressure is automatically at its boiling point of about $-258°$ F., carbon dioxide in cylinder 34 at this temperature is a solid, and nitrogen at this temperature under a relatively low pressure is a liquid. When nitrogen is used as the displacing gas, upon removal of the liquid methane the temperature of the cylinder 34 increases by absorption of heat from the atmosphere and with valves 40 and 41 being open and the valve in pipe 36 closed, pressure from this cylinder is transmitted through the small opening 44 in orifice plate 43 to one side of the pressure rupturable disk 42. When a predetermined pressure against this rupturable disk is attained, the disk ruptures thereby allowing nitrogen gas to flow through the open valve 39 and pipe 38 into the bottom of tank 31 thereby displacing vaporous methane through pipe 32, the valve therein being open. In this manner, the concentration of the methane vapor in tank 31 is reduced to such a low value as to reduce or minimize explosive hazard through possible inlet of air.

When the displacing gas is carbon dioxide, as mentioned above, it is a solid in cylinder 34 at the boiling point of liquid methane. Upon removal of the liquid methane from tank 31, this carbon dioxide purging operation substantially does not begin until the temperature of cylinder 34 rises above the normal sublimation temperature of carbon dioxide which is about $-110°$ F. When carbon dioxide is thus used the rupturable disk 43 is selected so that it ruptures at a relatively low pressure, for example, at values slightly above one atmosphere so that carbon dioxide gas will be injected into tank 31 at as low a temperature as possible, i.e., at a temperature slightly above its normal sublimation temperature. Also when carbon dioxide is used, orifice plate 43 need not be used or if it is desired to use an orifice plate the orifice therein should be relatively large so as not to unduly restrict the flow of carbon dioxide. It is preferable, however, when using carbon dioxide as herein disclosed, not to use such an orifice plate. However, when using carbon dioxide it is not essential to use even a rupturable disk because of the relatively low sublimation pressure of solid carbon dioxide at liquid methane storage temperatures. When it is desired not to use either the orifice plate or the rupturable disk, pipe 35 needs to extend through the wall of tank 31 to the exterior of the tank only for purposes of recharging the cylinder with carbon dioxide. I prefer, however, to use a rupture disk to eliminate direct contact of carbon dioxide with the methane with resulting dissolving of the carbon dioxide in the methane during the storage period.

I find that by using either carbon dioxide or nitrogen gas as herein contemplated that the explosive hazard attendant liquid methane storage is greatly minimized.

While I have disclosed my purging operation as directed to the storage of liquid methane, it is equally adaptable to the storage of such other inflammable hydrocarbons as ethane, ethylene, propane, propylene and even butane and butylene, the only condition being that the normal boiling point of the liquid being stored must be below atmospheric temperature so that upon removal of final traces of liquid a temperature responsive element such as a thermocouple or other suitable temperature responsive device, will increase in temperature to operate a motor valve for admission of purge gas or such increase in temperature as to cause pressure of purge gas in cylinder 34 to rupture a disk to allow passage of gas from the cylinder into the tank.

The storage of liquid methane or any of the other mentioned hydrocarbons can be in permanent type storage tanks such as would be disposed at a tank farm or in a refinery or in a natural gasoline extraction or other plant, or the storage tank can be such as would be employed in the transportation of such material. Such material can be transported in, for example, a barge and such a purging system as herein disclosed is quite satisfactory for such application.

In any installation for storage of such low boiling materials it is obvious that the storage tanks should be well insulated, the lower the boiling point of the material being stored the more efficient insulation should be provided.

When using nitrogen as the purge gas, it is essential to provide orifice plate 43 with orifice 44 of relatively small diameter. This diameter should be sufficiently small as to permit flow of nitrogen at such a rate that upon emerging as gas from the openings in pipe 20, the nitrogen will mix as little as possible with the residual methane gas to purge the methane by volume displacement. Less nitrogen is required when purging in this manner than when the incoming nitrogen exists from pipe 20 at a high velocity. The optimum diameter of the orifice will need to be determined specifically for each installation taking into account the application, storage tank size, and other conditions.

While certain embodiments of the invention have been described for illustrative purposes, the invention is not limited thereto.

I claim:
1. In a method for storing an inflammable liquefied gas having a normal boiling point substantially below expected atmospheric temperatures at substantially its normal boiling point and at substantially atmospheric pressure, the improvement comprising providing a fluid-tight storage zone having a vapor inlet and outlet and a liquid inlet and outlet, providing a noncombustible and noncombustion supporting normally gaseous material isolated from said zone, withdrawing said stored inflammable liquefied gas from said zone until said zone is substantially free of stored liquid, increasing the temperature of the vapor content of said zone to a predetermined temperature substantially above said normal boiling point and below atmospheric temperatures by absorption of heat from the atmosphere, introducing said noncombustible and noncombustion supporting gas into said zone in response to the increase in temperature to said predetermined temperature to displace at least some of the vapor of the previously stored liquid.

2. In the method of claim 1 wherein said noncombustible and noncombustion supporting gas is nitrogen.

3. In the method of claim 1 wherein said noncombustible and noncombustion supporting gas is carbon dioxide.

4. Apparatus for storing an inflammable liquefied gas at atmospheric pressure and at substantially its normal boiling point, comprising, a fluid-tight vessel, means for inlet and outlet of gas from said vessel, means for inlet and outlet of liquid from said vessel, a separate fluid-tight vessel disposed substantially on the bottom and within said first mentioned vessel, a conduit communicating from said separate fluid-tight vessel to the first mentioned vessel at a point near its bottom, a portion of said conduit being disposed outside of the first mentioned vessel, an orifice plate and a pressure rupturable diaphragm in the portion of said conduit outside said first mentioned vessel, said rupturable diaphragm being adapted to rupture upon increase of pressure from said separate vessel above a predetermined pressure and said orifice plate being adapted to regulate flow of fluid from said separate vessel to said first mentioned vessel upon rupture of said diaphragm.

5. Apparatus for storing an inflammable liquefied gas at atmospheric pressure and at substantially its normal boiling point comprising, in combination, a fluid-tight vessel, means for inlet and outlet of gas from said vessel, means for outlet and inlet of liquid from said vessel, a separate fluid-tight vessel disposed substantially on the bottom and within the first mentioned vessel, a conduit communicating from said separate fluid-tight vessel to the first mentioned vessel at a point near its bottom, a portion of said conduit being disposed outside of the first mentioned vessel, a pressure rupturable diaphragm in the portion of said conduit outside said first mentioned vessel, said rupturable diaphragm being adapted to rupture at a predetermined pressure above atmospheric pressure exerted from said separate vessel.

6. In the storage of an inflammable liquefied gas in a storage zone at a subatmospheric temperature, at substantially its normal boiling point and at atmospheric pressure, the improvement of reducing the explosive hazard of the vaporous contents of said zone after removal of the liquid contents thereof comprising providing an isolated quantity of a noncombustible and noncombustion supporting normally gaseous material within the above mentioned liquefied gas at said subatmospheric temperature in said storage zone, said isolated material being disposed inside and adjacent the bottom of said storage zone, withdrawing stored gas from said storage zone until said storage zone is substantially free of stored liquid, increasing the temperature of said material to a predetermined temperature between the normal boiling point of said liquefied gas and atmospheric temperature by absorption of heat from the atmosphere, and displacing said vapor from said storage zone by admitting said noncombustible and noncombustion supporting normally gaseous material from said isolated quantity to the bottom of said storage zone substantially below and in contact with said vapor in said zone in response to said predetermined temperature.

7. In the storage of an inflammable liquefied gas in a storage zone at a subatmospheric temperature, at substantially its normal boiling point and at atmospheric pressure, the improvement of reducing the explosive hazard of the vaporous contents of said zone after removal of the liquid contents thereof comprising providing an isolated quantity of a noncombustible and noncombustion supporting normally gaseous material within the above mentioned liquefied gas at said subatmospheric temperature in said storage zone, said isolated material being disposed inside and adjacent the bottom of said storage zone, withdrawing stored gas from said storage zone until said storage zone is substantially free of stored liquid, increasing the pressure of said noncombustible and noncombustion supporting normally gaseous material to a predetermined pressure between atmospheric pressure and the vapor pressure of said normally gaseous material at atmospheric temperature by absorption of heat from the atmosphere, and displacing said vapor from said storage zone by admitting said noncombustible and noncombustion supporting normally gaseous material from said isolated quantity of said normally gaseous material to the bottom of said storage zone substantially below and in contact with said vapor in said zone in response to said predetermined pressure.

8. In the storage of an inflammable liquefied gas in a storage zone at a subatmospheric temperature, at substantially its normal boiling point and at atmospheric pressure, the improvement of reducing the explosive hazard of the vaporous contents of said zone after removal of the liquid contents thereof comprising providing a noncombustible and noncombustion supporting normally gaseous material isolated from said zone, withdrawing stored gas from said storage zone until said storage zone is substantially free of stored liquid, increasing the temperature of the inflammable gas remaining in said storage zone to a predetermined temperature between the normal boiling point of said liquefied gas and atmospheric temperature after said zone is free of stored liquid by absorption of heat from the atmosphere, and displacing the remaining inflammable gas from said storage zone by admitting said noncombustible and noncombustion supporting normally gaseous material isolated from said zone to the bottom of said storage zone substantially below and in contact with said vapor in said zone in response to said predetermined temperature.

References Cited in the file of this patent

UNITED STATES PATENTS

| | | |
|---|---|---|
| 1,533,587 | Durborow | Apr. 14, 1925 |
| 1,912,458 | Mapes | June 6, 1933 |
| 2,189,147 | Mathisen | Feb. 6, 1940 |
| 2,543,362 | Getz | Feb. 27, 1951 |
| 2,650,478 | Brown | Sept. 1, 1953 |
| 2,656,856 | Brumberg | Oct. 27, 1953 |
| 2,718,330 | Adamson | Sept. 20, 1955 |

FOREIGN PATENTS

| | | |
|---|---|---|
| 14,244 | Great Britain | Oct. 3, 1888 |